J. P. HARRIS.
Plow.
No 15,649.
Patented Sept. 2, 1856.
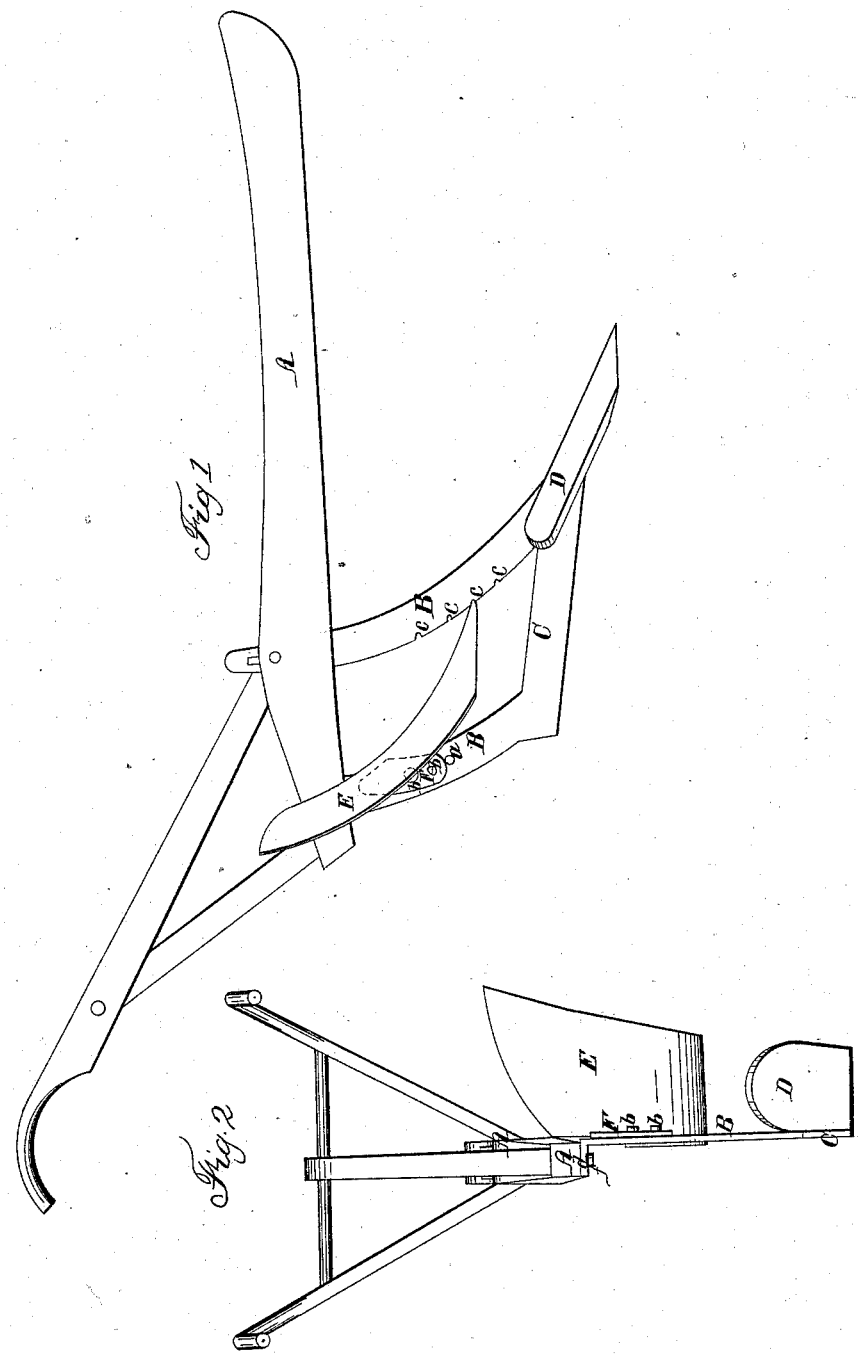

UNITED STATES PATENT OFFICE.

JOSEPHUS P. HARRIS, OF BYHALIA, MISSISSIPPI.

IMPROVEMENT IN PLOWS.

Specification forming part of Letters Patent No. 15,649, dated September 2, 1856.

*To all whom it may concern:*

Be it known that I, JOSEPHUS P. HARRIS, of Byhalia, in the county of Marshall and State of Mississippi, have invented a new and Improved Subsoil-Turning Plow; and I do hereby declare that the following is a full and exact description thereof, reference being had to the accompanying drawings, making part of this specification—

Figure 1 being a side view of the plow, and Fig. 2 a hind view of the same.

Like letters designate corresponding parts in both figures.

The nature of my invention consists in combining with a subsoil-plow a mold-board movable to different heights for the purpose of turning furrow-slices of different depths while opening the subsoil, and also, when desired, of adapting the plow to ordinary use.

The landside is composed of two standards or braces, B B, connected by a ground-bar, C, and the whole may be welded together so as to form a single piece. To this the share or subsoil-blade D is secured in any convenient manner. The front brace, B, is sharpened on the front edge, thereby serving as the colter of the plow; and in its hind edge a series of notches, $c\ c$, is made, as represented in Fig. 1. The hind brace is provided with a series of holes, $a$, Fig. 1, corresponding in position with the notches $c\ c$ in the front brace. The forward extremity of the mold-board E is made to fit into any one of the notches $c\ c$, and a flange, F, welded or otherwise united to the rear side of the mold-board, is perforated with holes, through which and the proper holes $a$ of the hind brace bolts or screws $b\ b$ pass and secure the mold-board to the landside. By shifting the bolts to different holes in the hind brace, and the end of the mold-board to different notches in the front brace, the mold-board can be moved in position so as to turn a furrow-slice of variable thickness, while the subsoil-blade continues at a constant depth; or the mold-board may be placed so as to constitute a continuation of said blade or share, and thus change the subsoil into an ordinary plow.

The front brace or colter may pass up through a mortise in the beam A, and the hind brace may have its upper end bent at right angles, so as to form a flange, $d$, through which a screw, $f$, may pass to secure it to the beam.

The landside should be even, or nearly so, with the right side of the beam, as shown in Fig. 2, in order to allow the mold-board to be moved up and down.

What I claim as my invention, and desire to secure by Letters Patent, is—

Combining with a subsoil-plow a mold-board movable to different heights, substantially in the manner and for the purposes specified.

JOSEPHUS P. HARRIS.

Witnesses:
A. R. CHILTON,
W. H. PUGH.